G. BRAUCHLIN.
FABRIC MEASURING AND MARKING APPARATUS.
APPLICATION FILED AUG. 12, 1907.

919,314.

Patented Apr. 27, 1909.
3 SHEETS—SHEET 1.

Witnesses:

Inventor:
Gottlieb Brauchlin.
par
Attorneys.

G. BRAUCHLIN.
FABRIC MEASURING AND MARKING APPARATUS.
APPLICATION FILED AUG. 12, 1907.

919,314.

Patented Apr. 27, 1909.
3 SHEETS—SHEET 2.

Witnesses:
Fr. Schultz
A. Morrill

Inventor:
Gottlieb Brauchlin.
per R. Hadden
Attorneys.

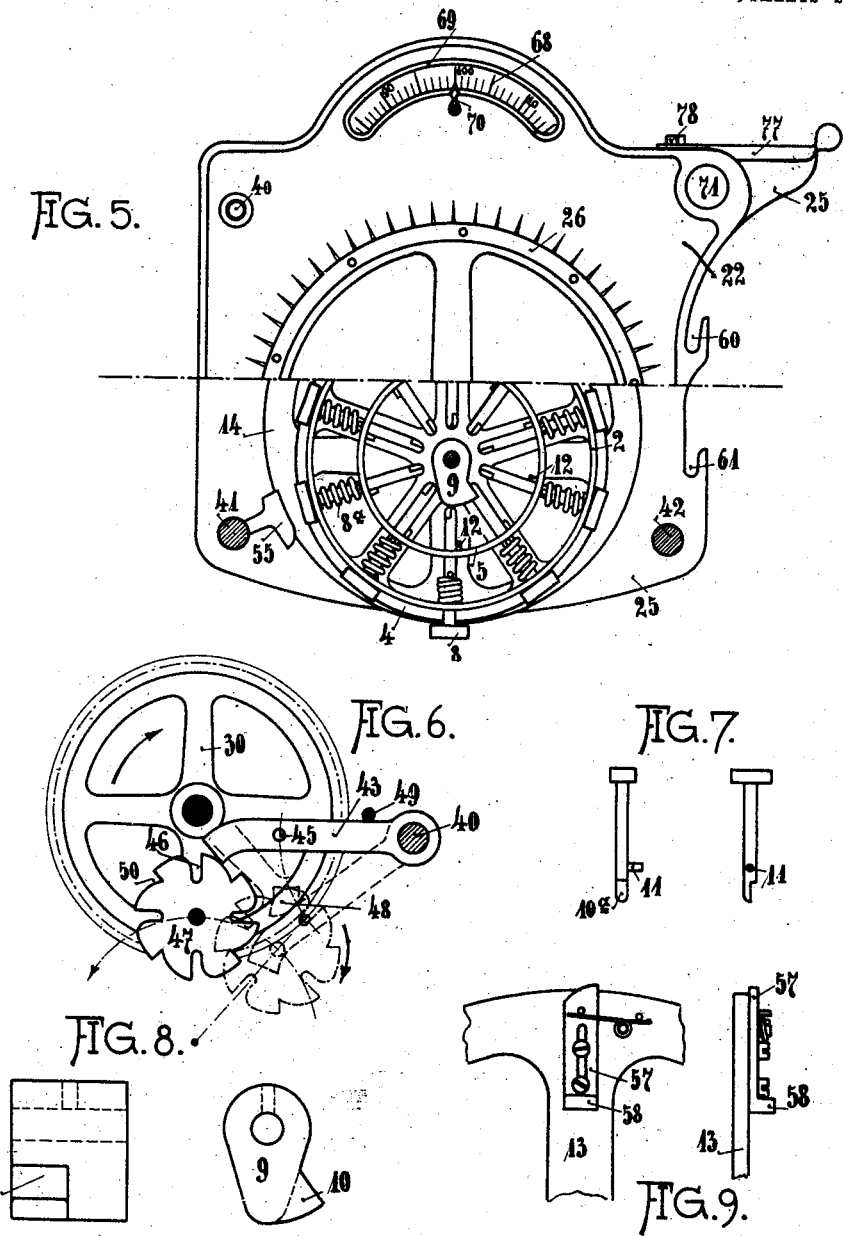

UNITED STATES PATENT OFFICE.

GOTTLIEB BRAUCHLIN, OF ZURICH, SWITZERLAND.

FABRIC MEASURING AND MARKING APPARATUS.

No. 919,314.    Specification of Letters Patent.    Patented April 27, 1909.

Application filed August 12, 1907.  Serial No. 388,222.

*To all whom it may concern:*

Be it known that I, GOTTLIEB BRAUCHLIN, a citizen of the Swiss Republic, residing at Zurich, Switzerland, have invented a certain new and useful Fabric Measuring and Marking Apparatus, of which the following is a specification.

This invention relates to fabric measuring and marking apparatus of the type wherein type-wheels which rotate about their own axes and revolve about the axes of a measuring wheel carry movable printing types which are successively thrust into printing position by means of a fixed abutment.

The invention consists in eccentrically mounting the casing of the type-wheels, so that the revolution of the casing with the type wheels about the axis of the measuring wheel can be continuous instead of intermittent, and in causing the "tens" type-wheel to be rotated at the proper intervals by the "units" type-wheel, instead of by means of an abutment. These improvements produce smoother and more reliable action of the apparatus.

A construction embodying the invention is shown in the annexed drawing.

Figure 1:
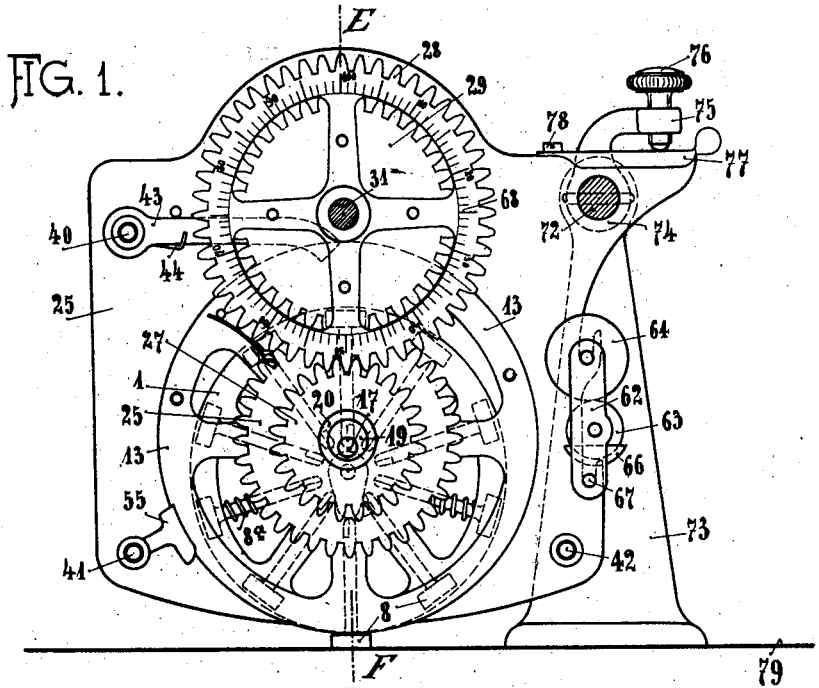
Figure 2:
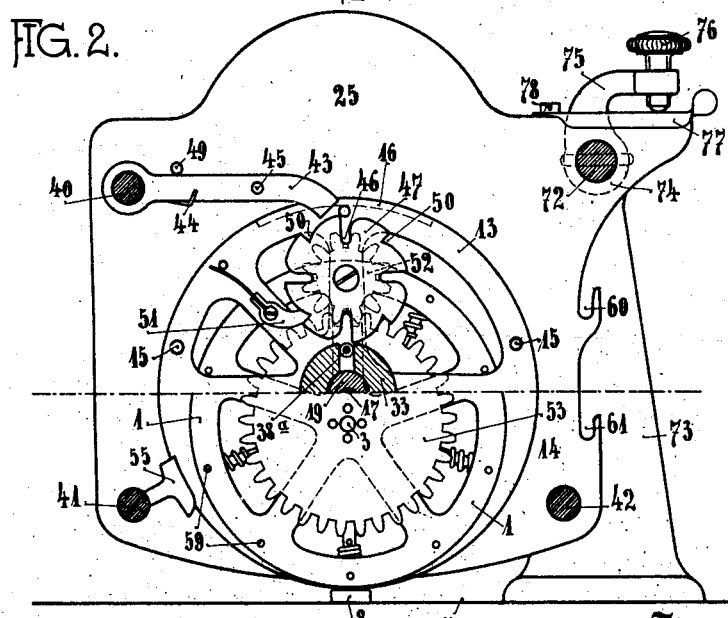
Figure 3:
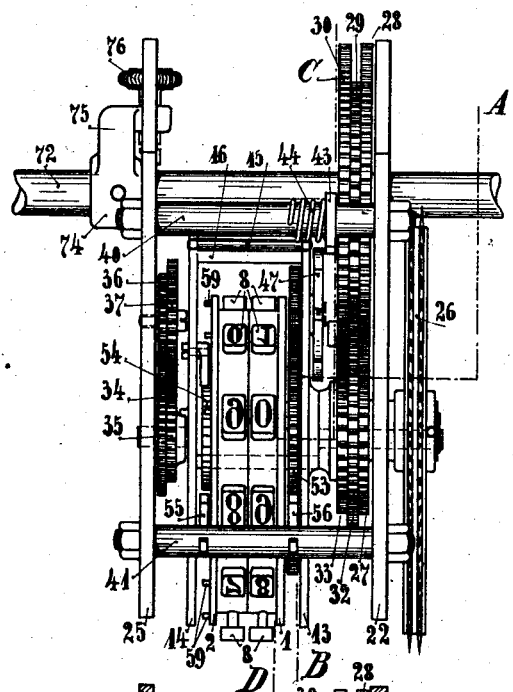
Figure 4:
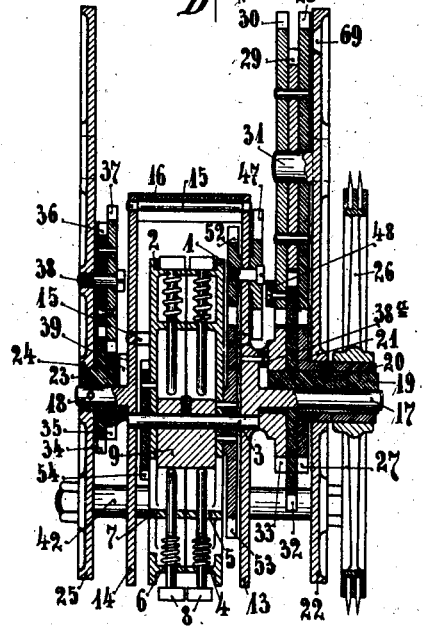

Figure 1 is a side view of the apparatus with certain parts omitted. Fig. 2 a section on the line C—D of Fig. 3, Fig. 3 a front view, Fig. 4 a section on the line E—F of Fig. 1, and Fig. 5 a section on the line A—B of Fig. 3. Fig. 6 shows the mechanism for rotating the "units" type-wheel, and Fig. 7 comprises two views at right angles to one another of the type bearing the figure 9 of the units type-wheel. Fig. 8 shows a type-actuating cam and Fig. 9 means of adjusting the type-wheels.

Two type-wheels 1 and 2 are loosely mounted on an axle 3. Each of these wheels consists of a disk, and has two concentric circular flanges, the flanges of the wheel 1 being marked 4 and 5, and the flanges of the wheel 2 being marked 6 and 7. Each pair of concentric flanges has co-axial holes which serve as guides for the types 8, and each wheel carries ten types, the types of the wheel 1 serving to print the units, and the types of the wheel 2 serving to print the tens. The types have stems or shanks with rounded ends, and represent the numerals 0 to 9. Each shank is traversed by a pin against which abuts one end of a helical spring $8^a$, the other end of the latter abutting against the flange 4 or 6. Between the two type-wheels a cam 9 is fixed to the axle 3 in the path of the shanks of the types. Adjacent the units wheel 1 the cam 9 has a projection 10, and the rounded ends of the shanks of the units types are cut away as at $10^a$ (Fig. 7). The "9" type of the units wheel (Fig. 7) has a lateral projection 11 adapted to co-act with projections 12 fixed to the flange 7 of the "tens" wheel.

The ends of the axle 3 are fixed to parallel disks 13 and 14 connected to each other by cross-bars 15. A leaden plate 16 is arranged between the disks 13 and 14 to balance the casing. The disk 13 has a gudgeon 17 and the disk 14 a gudgeon 18. The gudgeon 17 is rotatable and eccentric in a hollow shaft 19, which is rotatable in a sleeve 20, the latter being itself rotatable in an aperture 21 in the wall 22 of the apparatus. The gudgeon 18 is rotatable and eccentric in a hollow shaft 23, which is rotatable in an aperture 24 in the wall 25 of the apparatus. To the sleeve 20 is fixed a measuring wheel 26, which is, for example, provided with spikes or pins adapted to engage the fabric so that movement of the latter rotates the measuring wheel. A gear wheel 27 integral with the sleeve 20 meshes with a gear wheel 28 rigidly fixed to gear-wheels 29 and 30. The gear wheels 28 29 and 30 are rotatable on a pivot 31 fixed to the wall 22.

The hollow shaft 19 is integral with a toothed wheel 32 which meshes with the wheel 29. A gear wheel 33 rotatable on the shaft 19 meshes with the gear wheel 30. The hollow shaft 23 is integral with a gear wheel 34, and a gear-wheel 35 is rotatable on the said shaft. The gear wheel 34 meshes with a gear wheel 36, and the gear wheel 35 meshes with a gear wheel 37. The wheels 36 and 37 are fixed to each other and are rotatable on a pivot 38 screwed into the wall 25. The hub of the toothed wheel 33 has a radial slot into which fits a roller $38^a$ mounted on a pin fixed to the disk 13. To the disk 14 is fixed a projection 39 which engages a slot in the toothed wheel 35.

The parallel walls 22 and 25 are connected to each other by cross-bars 40, 41 and 42. A lever 43 connected to a spring 44 is fulcrumed on the bar 40 and has fixed to it a pin 45 adapted to engage notches 46 in a wheel 47 supported by the disk 13. An abutment 48 is fixed to the wheel 30 and depresses the lever 43 during the rotation of the said wheel. An abutment 49 (Fig. 6) fixed to the wall 22 limits the upward movement of the lever. The wheel 47 is also provided with notches 50 adapted to be engaged by a spring-pressed pawl 51 pivoted to the disk 13. The axle of the wheel 47 traverses the disk 13 and has fixed to it a toothed wheel 52 meshing with a toothed wheel 53 fixed to the type-wheel 1. A ratchet-wheel 54 is fixed to the type-wheel 2 and co-acts with a pawl pivoted to the disk 14.

To the bar 41 are fixed abutments 55 and 56 located in the paths of slides 57 (Fig. 9) carried by the disks 13 and 14; these slides are spring-pressed and radially movable, and each of them has a projection 58 adapted to extend into the path of pins 59 projecting laterally from the adjacent type-wheel 1 or 2.

The walls 22 and 25 have brackets 60 61 for supporting the inking mechanism 62 (Fig. 1). The latter comprises two rotatable india-rubber rolls 64 and 63 placed in contact with each other and mounted in a frame 62 which supports an ink-trough 66. Lateral projections 67 and projecting parts of the axle of the roll 64 rest in the brackets 60 and 61 respectively.

On the wheel 28 there is a scale 68 with divisions marked from 0 to 100. The wall 22 has an aperture 69 and a pointer 70.

The walls 22 and 25 have apertures traversed by an axle 72 fixed to the upper ends of pedestals 73 by which the apparatus is supported. A sleeve 74 fixed to the axle 72 has an angular projection 75. A screw 76 screwed into the latter serves as an adjustable abutment for a projecting part of the wall 25, and allows of regulating the distance of the mechanism from the table on which the apparatus is placed. A movable plate 77 pivotally connected to the wall 25 at 78 can be pushed between the upper surface of the wall and the screw 76 in order to rock the mechanism through a certain angle. The pedestals 73 are fixed to a measuring board 79.

The action of the apparatus is as follows. The fabric to be measured is drawn over the measuring board under the apparatus, the latter being adjusted by means of the screw 76 so that the spikes on the wheel 26 penetrate into the fabric to a slight extent. By this means the wheel is rotated by the movement of the fabric. The sleeve 20 transmits the rotation to the gear wheels 28 29 and 30. The gear wheel 29 drives the shaft 19, and the gear wheel 30 drives the gear wheel 33. The casing consisting of the disks 13 and 14 thus receives a double movement. Its center is revolved about the axis of the shaft 19, and the casing itself rotates about the axes of the gudgeons 17 and 18, the disk 13 being rotated by means of the roll 38ª engaging the slot in the wheel 33. The projection fixed to the disk 14 causes the toothed wheel 35 to rotate and thus drives the wheels 36 and 37. The wheel 34 transmits rotation from the wheel 36 to the wheel 23 with the eccentric gudgeon 18. The ratio of the gear corresponds to the ratio of the measuring wheel circumference to the unit of length used. If, for example, the measuring wheel makes two revolutions per unit of length, the wheel 28 has twice as many teeth as the wheel 27, and the wheel 30 twice as many teeth as the wheel 33. The wheels 29 and 32 always have the same number of teeth. The shaft 19 then makes one revolution while the measuring wheel makes two revolutions. The disks 13 and 14 make the same number of revolutions as the measuring wheel. The ratio of the wheels 34, 35, 36 and 37 is such that the gudgeons 17 and 18 receive equal eccentric movement. During each revolution of the wheel 30 the abutment 48 depresses the lever 43 into the position indicated in Fig. 6 by dotted lines. The pin 45 is thus caused to engage one of the notches 46 in the wheel 47 and holds the latter back. Since the disk 13 continues to rotate the wheel 47 must make part of a revolution about its axis, in the direction indicated by the arrow. When the abutment 48 has cleared the lever the latter is thrust upward by the spring 44 and releases the wheel 47. The pawl 51 prevents rotation of the wheel 47 in the opposite direction. The rotation imparted to this wheel is transmitted by the axle thereof to the gear-wheel 52, and by the latter to the gear-wheel 53. The dimensions of the wheels are such that this rotation of the gear wheel 53, and of the type-wheel 1 fixed thereto, amounts to one-tenth of a revolution. During the rotation of the type-wheel 1 the shanks of the types successively come into contact with the cam 9, by which they are radially thrust outward, against the action of their springs, and are momentarily held in the projecting position by the part 10 of the cam. When the "9" type is thrust into this position the projection 11 with which its shank is provided engages one of the projections 12 of the type-wheel 2 and rotates the latter until the shank has cleared the part 10 and has been thrust inward by its spring. The length of the part 10 is so calculated that the type-wheel 2 makes one tenth of a revolution while the type-wheel 1 makes one revolution, the rotation of the wheel 2 taking place during the tenth actuation of the wheel 1. The ratchet-wheel 54 prevents rotation of the type-wheel 2 in the opposite direction. Accidental overrunning movement of the type-wheels 1 and 2 is prevented by the slides 57 and pins 59. The slides 57 are radially displaced by the abutments 55 and 56 at the moment when the type-wheels are rotated, and the projections 58 only release the pins during that rotation. The types thrust out take ink from the roll 64 and transfer the same to the fabric. The roll 64 is inked by the roll 63, which takes ink from the trough 66. The rolls are rotated by friction with the types.

Since the wheel rotates with half the speed of the casing 13 14, in the example described, the lever 43 is only actuated by the abutment 48 once during two revolutions of the casing, and the types must only print once during these two revolutions. For this purpose the gudgeons 17 and 18 are eccentrically mounted in the hollow shafts 19 and 23, as aforesaid, and these shafts make one revolution during two revolutions of the casing. The latter, with the type-wheels therein, is thus alternately moved to and from the measuring board during successive revolutions of the casing. The axle 3 and the type-actuating mechanism are of course so arranged that the impressions are made when the casing is nearest to the measuring board.

The types of the "units" wheel print the unit values on the cloth, and the types of the "tens" wheel the decadal values. Fractional values are read off the scale 68 through the aperture 69, with the aid of the pointer 70. At the starting position two ciphers "0 0" are printed. After two revolutions the units wheel is rotated and the number "01" is printed, then "02", "03" etc. to "09", whereupon the projection 11 rotates the "tens" wheel and the number "10" is printed, succeeded by "11" etc.

To keep the cloth flat and smooth under the apparatus, loosely suspended metal rods may be arranged to lie on the cloth in front of the apparatus and behind the same.

The apparatus can of course be constructed to measure according to any system of units, the size of the measuring wheel, type-wheels and scale divisions being chosen accordingly. The circumference of the measuring wheel may be one half, one third or some other convenient fraction of the unit, so that there is a convenient relation between the diameters of the measuring and type-wheels. The ratio of the gear wheels is of course chosen accordingly.

What I claim as my invention and desire to secure by Letters Patent of the United States is:—

1. In a measure printing device the combination of a frame, a measuring wheel carried by a sleeve journaled in the frame, a rotary casing journaled eccentrically with regard to said sleeve, means for rotating the casing at the same peripheral speed as the measuring wheel, type wheels mounted in the casing, an abutment on the frame a ratchet wheel on the casing adapted to receive a part rotation by said abutment, and gear for rotating the unit type wheel from said ratchet wheel.

2. In a measure printing device the combination of a frame, a measuring wheel carried by a sleeve journaled in the frame, a rotary casing journaled eccentrically with regard to said sleeve, means for rotating the casing at the same peripheral speed as the measuring wheel, type wheels mounted in the casing, a spring controlled abutment lever pivoted on the frame, a ratchet wheel journaled eccentrically on the casing and adapted on rotation thereof to meet and engage said abutment lever and receive a part rotation previous to tripping said abutment lever, gear for rotating the unit type wheel from said ratchet wheel, and means on said unit type wheel to operate on each completed revolution a part turn of the tens type wheel.

In witness whereof I have signed this specification in the presence of two witnesses.

GOTTLIEB BRAUCHLIN.

Witnesses:
JENS OVBANN,
A. LIEBERKNECHT.